United States Patent
Chen et al.

(10) Patent No.: US 11,606,274 B1
(45) Date of Patent: Mar. 14, 2023

(54) METHOD FOR OPERATIONS OF VIRTUAL MACHINES IN MONITORING CLOUD ACTIVITIES, SYSTEM, AND DEVICE APPLYING THE METHOD

(71) Applicant: Fulian Precision Electronics (Tianjin) Co., LTD., Tianjin (CN)

(72) Inventors: Guan-Ru Chen, New Taipei (TW); Chun-Nan Yu, New Taipei (TW)

(73) Assignee: Fulian Precision Electronics (Tianjin) Co., LTD., Tianjin (CN)

( * ) Notice: Subject to any disclaimer, the term of this patent is extended or adjusted under 35 U.S.C. 154(b) by 0 days.

(21) Appl. No.: 17/550,129

(22) Filed: Dec. 14, 2021

(30) Foreign Application Priority Data

Aug. 30, 2021 (CN) .......................... 202111005579.7

(51) Int. Cl.
*H04L 43/0817* (2022.01)
*H04L 67/561* (2022.01)
*G06F 9/455* (2018.01)
*H04L 43/0882* (2022.01)
*H04L 43/50* (2022.01)

(52) U.S. Cl.
CPC ...... *H04L 43/0817* (2013.01); *G06F 9/45558* (2013.01); *H04L 43/0882* (2013.01); *H04L 43/50* (2013.01); *H04L 67/561* (2022.05); *G06F 2009/45591* (2013.01); *G06F 2009/45595* (2013.01)

(58) Field of Classification Search
CPC ............. H04L 43/0817; H04L 43/0882; H04L 43/0884; G06F 9/45558; G06F 2009/45591; G06F 2009/45595
See application file for complete search history.

(56) References Cited

U.S. PATENT DOCUMENTS

| | | | |
|---|---|---|---|
| 2014/0029451 A1* | 1/2014 | Nguyen | H04L 43/50 370/252 |
| 2019/0190771 A1* | 6/2019 | Fang | H04L 41/40 |
| 2021/0035116 A1* | 2/2021 | Berrington | G06F 9/54 |
| 2022/0103415 A1* | 3/2022 | Calixte-Civil | H04L 41/0233 |
| 2022/0172037 A1* | 6/2022 | Kang | G06N 3/0445 |

FOREIGN PATENT DOCUMENTS

CN    110572439 A    12/2019

\* cited by examiner

*Primary Examiner* — Kostas J Katsikis
(74) *Attorney, Agent, or Firm* — ScienBiziP, P.C.

(57) ABSTRACT

A method for monitoring operations of cloud server through virtual machines is used in a virtual machine monitoring system with a central monitoring system, a cloud platform, virtual exchangers, and virtual machines. The central monitoring system sends an instruction to obtain to the cloud platform. The cloud platform transmits the instruction to the virtual machine through the virtual exchanger. The virtual machine searches for operation information and sends such information to the cloud platform by the virtual exchanger. The cloud platform transmits the operation information to the central monitoring system. The central monitoring system monitors and manages the operation information. A virtual machine operation monitoring device and a virtual machine monitoring system applying the method are also provided.

8 Claims, 4 Drawing Sheets

METHOD FOR OPERATIONS OF VIRTUAL MACHINES IN MONITORING CLOUD ACTIVITIES, SYSTEM, AND DEVICE APPLYING THE METHOD

FIELD

The subject matter herein generally relates to cloud monitoring, specifically to a method for monitoring operations of virtual machines, a system, and a device employing the method.

BACKGROUND

A terminal can monitor a cloud device and other terminals through network. In a central monitoring system, virtual machines connect with a network interface. While transmitting data, information can be easily leaked.

Thus, there is room for improvement in the art.

BRIEF DESCRIPTION OF THE DRAWINGS

Implementations of the present disclosure will now be described, by way of example only, with reference to the attached figures.

DETAILED DESCRIPTION

Figure 1:
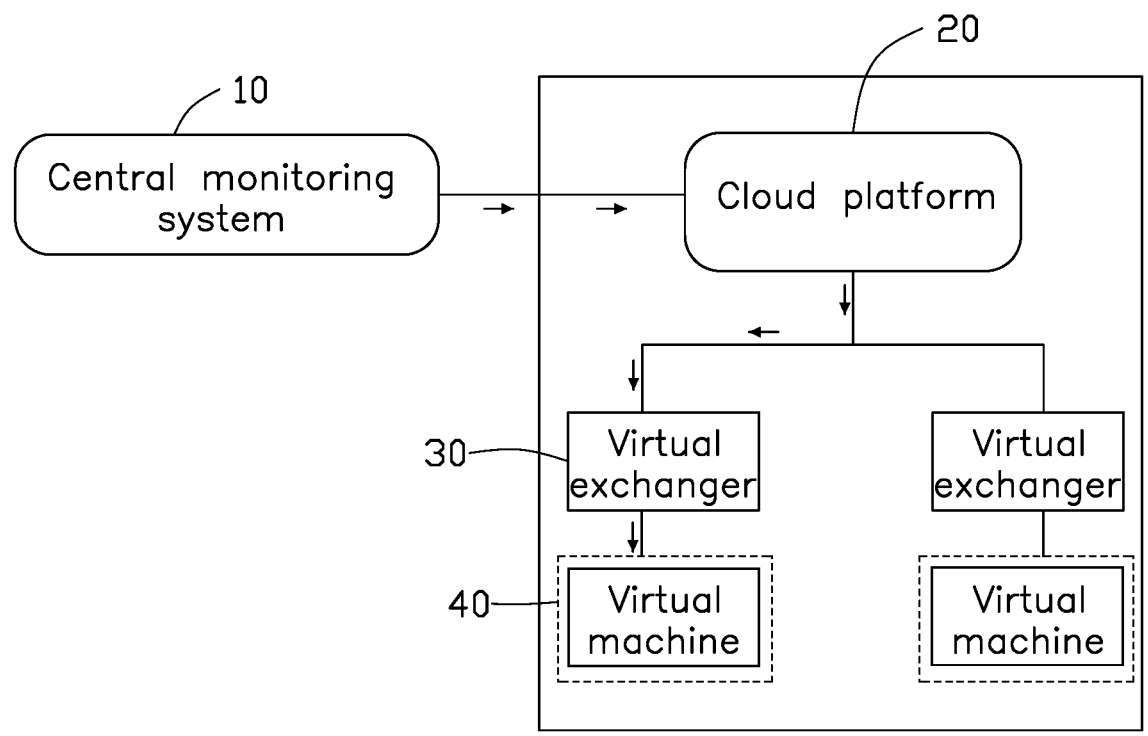
FIG. 1 is a diagram illustrating an embodiment of a virtual machine monitoring system according to the present disclosure.

The present disclosure is described with reference to accompanying drawings and the embodiments. It will be understood that the specific embodiments described herein are merely part of all embodiments, not all the embodiments. In addition to the embodiments of the present disclosure, any other embodiments obtained by persons skilled in the art without creative effort shall all fall into the scope of the present disclosure.

It will be understood that the specific embodiments described herein are merely some embodiments, not all the embodiments.

Unless otherwise defined, meanings of all technical and scientific terms used in this specification are the same as that usually understood by a person skilled in the art to which the present disclosure belongs. In the present disclosure, terms used in the specification of the present disclosure are merely intended to describe objectives of the specific embodiments, but are not intended to limit the present disclosure.

The present disclosure provides a virtual machine monitoring system. The virtual machine monitoring system includes a central monitoring system, a cloud platform, virtual exchangers, and virtual machines. The central monitoring system connects with the cloud platform. The cloud platform connects with the virtual exchangers. Each virtual exchanger connects with a virtual machine. The central monitoring system is configured to send an obtaining instruction to the cloud platform. The cloud platform is configured to transmit the obtaining instruction to the virtual exchangers. The virtual exchangers are configured to transmit the obtaining instruction to the virtual machines. The virtual machines are configured to search for operation information based on the received obtaining instruction and send the operation information to the virtual exchangers. The virtual exchangers further transmit the operation information to the cloud platform. The cloud platform further transmits the operation information to the central monitoring system. The central monitoring system further monitors and manages the operation information.

The present disclosure further provides a method for monitoring operations of the virtual machines used in the virtual machine monitoring system. The system includes a central monitoring system, a cloud platform, virtual exchangers, and virtual machines. The method includes sending an obtaining instruction by the central monitoring system to the cloud platform. The cloud platform transmits the obtaining instruction to the virtual exchangers. The virtual exchangers transmit the obtaining instruction to the virtual machines. The virtual machines search for operation information based on the received obtaining instruction and send the operation information to the virtual exchanger. The virtual exchangers further transmit the operation information to the cloud platform. The cloud platform further transmits the operation information to the central monitoring system. The central monitoring system further monitors and manages the operation information.

The central monitoring system sends the obtaining instruction to the cloud platform, then the cloud platform transmits the obtaining instruction to the virtual machines through the virtual exchangers. The operation information in the virtual machines is transmitted to the cloud platform through the virtual exchangers, and then the cloud platform transmits the operation information to the central monitoring system. The virtual exchanger has an insulating function in relation to a network, thus information can be safely transmitted.

FIG. 1 shows a virtual machine monitoring system includes a central monitoring system 10, a cloud platform 20, virtual exchangers 30, and virtual machines 40. The central monitoring system 10 connects with the cloud platform 20. The cloud platform 20 connects with the virtual exchangers 30. Each virtual exchanger 30 connects with a virtual machine 40.

The central monitoring system 10 sends an obtaining instruction to the cloud platform 20. The cloud platform 20 transmits the obtaining instruction to the virtual exchangers 30. The virtual exchangers 30 transmit the obtaining instruction to the virtual machines 40. The virtual machines 40 search for operation information based on the received obtaining instruction and send the operation information to the virtual exchangers 30. The virtual exchangers 30 further transmit the operation information to the cloud platform 20. The cloud platform 20 further transmits the operation information to the central monitoring system 10. The central monitoring system 10 further monitors and manages the operation information.

When obtaining the operation information of one of the virtual machines 40, the obtaining instruction sent by the central monitoring system 10 must include an internet protocol (IP) address and a virtual local area network identifier vlanID.

The cloud platform 20 stores information of the virtual machines, for example, network information of each virtual machine 40 (such as the IP addresses, the virtual local area network identifier vlanID, network interface information, and a mapping relationship between the virtual machines 40 and the virtual exchangers 30).

The cloud platform 20 selects one virtual exchanger 30 which matches with the virtual machine 40 according to the mapping relationship between the virtual machines 40 and the virtual exchangers 30 based on the IP address and the virtual local area network identifier vlanID in the obtaining instruction. Then, the cloud platform 20 sends the obtaining instruction to the selected virtual exchanger 30.

The virtual exchanger 30 can be formed by a OpenvSwitch tool executed in a virtual platform with several layers. The virtual exchanger 30 provides same functions to the virtual machine 40 as those of a physical exchanger, such as network insulation, QoS configuration, network flow monitoring, data package analysis, and the like. The virtual exchanger 30 can be extended by being programed to achieve an automatic configuration, management, and maintenance in a large network. The virtual exchanger 30 also supports standard management interfaces and standard protocols.

The virtual exchanger 30 sends the obtaining instruction to the corresponding virtual machine 40 based on the IP address and the virtual local area network identifier vlanID in the obtaining instruction.

A monitoring agent is embedded in the virtual machine 40. When receiving the obtaining instructions, the monitoring agent in the virtual machine 40 executes to capture operation information of the virtual machine 40. The operation information includes a utilization of a central process unit (CPU), a consumption of memory, usage of a hard disk, run state of an operation system in the virtual machine 40, and information flow of the virtual machine 40 in different time periods.

The monitoring agent collects the operation information and sends the collected operation information to the corresponding virtual exchanger 30. The virtual exchanger 30 transmits the operation information to the cloud platform 20. Then, the cloud platform 20 transmits the operation information to the central monitoring system 10. The central monitoring system 10 monitors and manages the operation information.

Figure 2:
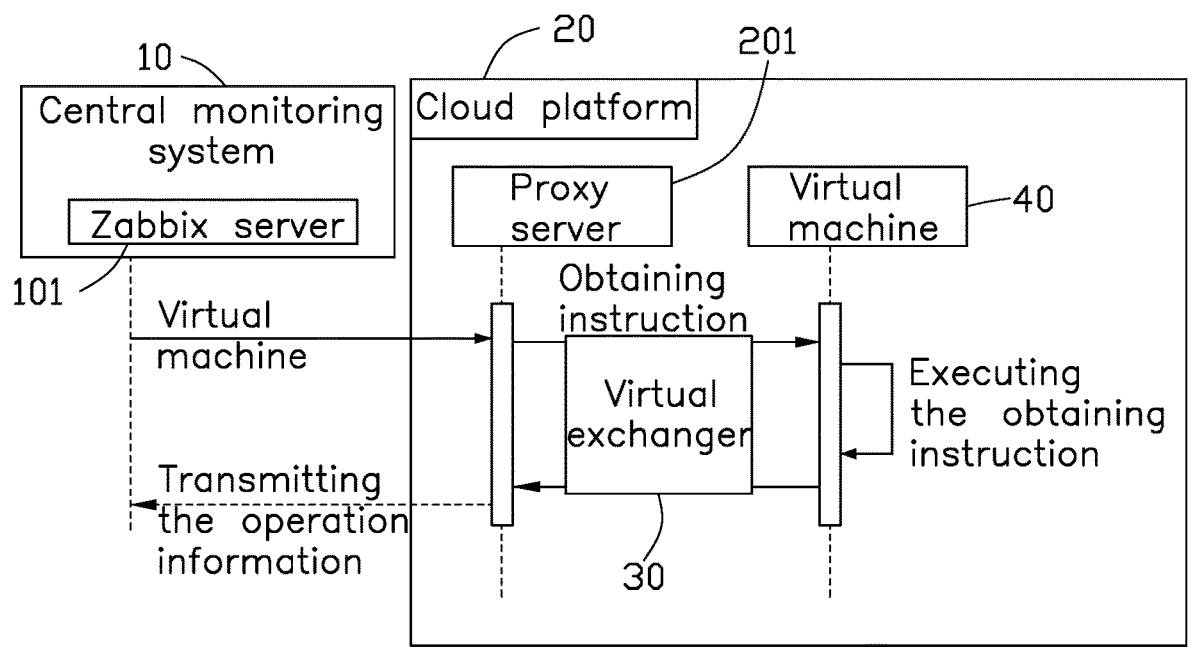
FIG. 2 is a diagram illustrating an embodiment of a Zabbix construction used in the monitoring system of FIG. 1 according to the present disclosure.

As shown in FIG. 2, in an embodiment, a Zabbix server 101 is embedded in the central monitoring system 10. The agent in the virtual machine 40 is a Zabbix client. The Zabbix client receives the obtaining instruction and collects the operation information of the virtual machine 40 based on the obtaining instruction. The cloud platform 20 includes a proxy server 201. The proxy server 201 connects with the Zabbix server 101 and the virtual exchanger 30. The proxy server 201 transmits the obtaining instruction from the Zabbix server 101 to the virtual exchanger 30.

The proxy server 201 and the virtual exchanger 30 connect through a network namespace.

The network namespace includes a virtual network identifier, an IP address of the virtual machine 40, and a test project code. The proxy server 201 selects the specified virtual exchanger 30 based on the network namespace formed by the network identifier, the IP address, and the test project code.

For example, the proxy server 201 in a Openstack cloud platform names a network interface of the virtual exchanger 30 based on a fixed prefix code with an information intercepted from identification (ID) of a network interface in the virtual machine 40. For example, when the ID of the network interface in the virtual machine 40 is f467189c-341f-42fc-8056-065255e14530, the network interface of the virtual exchanger 30 corresponding to the virtual machine 40 is named as "qvo-f467189c-34".

Figure 3:
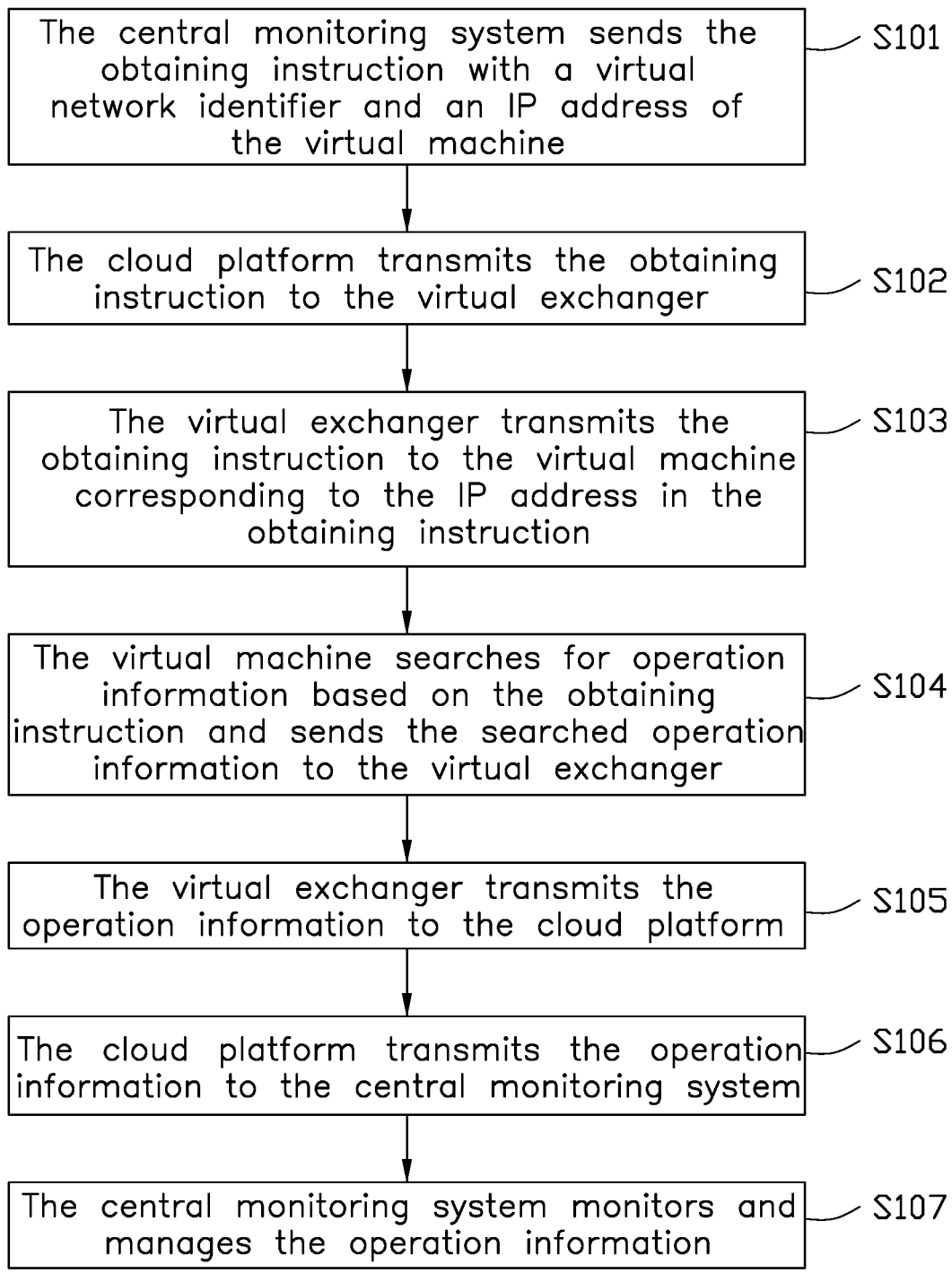
FIG. 3 is a flowchart illustrating an embodiment of a method for monitoring operations of virtual machines according to the present disclosure.

FIG. 3 shows a flowchart of a method for monitoring operations of virtual machines used in a virtual machine monitoring system. The virtual machine monitoring system includes a central monitoring system 10, a cloud platform 20, virtual exchangers 30, and virtual machines 40. The central monitoring system 10 connects with the cloud platform 20. The cloud platform 20 connects with the virtual exchangers 30. Each virtual exchanger 30 connects with a virtual machine 40. For different requirements, a sequence of steps in the flowchart diagram can be changed, and some steps can be omitted. The method includes the following steps, these steps may be re-ordered:

In block S101, the central monitoring system 10 sends an obtaining instruction to the cloud platform 20 with a virtual network identifier and an IP address of the virtual machine 40.

In block S102, the cloud platform transmits the obtaining instruction to the virtual exchanger 30.

In block S103, the virtual exchanger 30 transmits the obtaining instruction to the virtual machine 40 corresponding to the IP address in the obtaining instruction.

In block S104, the virtual machine 40 searches for operation information based on the obtaining instruction and sends the searched operation information to the virtual exchanger 30.

In block S105, the virtual exchanger 30 transmits the operation information to the cloud platform 20.

In block S106, the cloud platform 20 transmits the operation information to the central monitoring system 10.

In block S107, the central monitoring system 10 monitors and manages the operation information.

A Zabbix server 101 is embedded in the central monitoring system 10. The agent in the virtual machine 40 is a Zabbix client. The Zabbix server 101 sends the obtaining instruction to the cloud platform 20. The cloud platform transmits the obtaining instructions to the virtual machine 40 through the virtual exchanger 30. The Zabbix client collects the operation information of the virtual machine 40 based on the obtaining instruction.

In some embodiment, a network node of the cloud platform 20 sets up a proxy server 201. The method further includes:

The proxy server 201 receives the obtaining instruction from the Zabbix server 101.

The proxy server 201 connects with the virtual exchanger 30 through a network namespace. The proxy server 201 transmits the obtaining instruction to the virtual exchanger 30. The proxy server 201 receives the operation information transmitted by the virtual exchanger 30, sent by the virtual machine 40, and transmits the operation information to the Zabbix server 101.

In an embodiment, the network namespace includes a virtual network identifier, an IP address of the virtual machine 40, and a test project code. The proxy server 201 selects the specified virtual exchanger 30 based on the network namespace formed by the network identifier, the IP address, and the test project code.

In an embodiment, the virtual exchanger 30 is formed by a OpenvSwitch tool. The virtual exchanger 30 provides a network insulation protection. The method for forming the network namespace includes:

A current network namespace is checked and a new network namespace is added. A new virtual network identifier, an IP address of the virtual machine 40, and a test project code are added. The newly added virtual network identifier, the IP address of the virtual machine 40, and the test project code are added into the newly added virtual network identifier.

In an embodiment, the central monitoring system 10 includes a Prometheus server, and the virtual machine 40 includes an exporter. The Prometheus server sends a collection instruction to the cloud platform 20. The cloud platform 20 transmits the collection instruction to the virtual machine 40 through the virtual exchanger 30. The exporter in the virtual machine 40 receives the collection instruction and collects the operation information in the virtual machine 40 based on the collection instruction.

Figure 4:
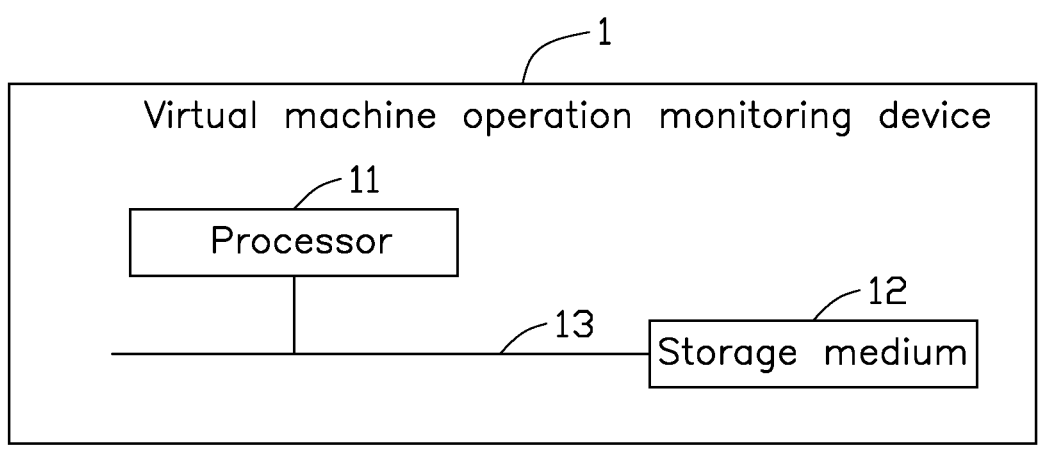
FIG. 4 is a diagram illustrating an embodiment of a virtual machine operation monitoring device according to the present disclosure.

As shown in FIG. 4, a virtual machine operation monitoring device 1 includes a processor 11 and a storage medium 12, and a communication bus 13 which connects with the processor 11 and the storage medium 12. The storage medium 12 stores computer readable programs. The processor 11 executes the stored computer readable programs to implement the above method for monitoring operations of the virtual machines.

The processor 11 can be a central processing unit (CPU), or other universal processor, such as a digital signal process (DSP), an application specific integrated circuit (ASIC), a field-programmable gate array (FPGA), or other programmable logic component, discrete gate or transistor logic, discrete hardware components, and so on. The universal processor can be a microprocessor or the at least one processor can be any regular processor, or the like.

The storage medium 12 stores the computer readable programs and/or modules and/or units. The processor 11 can invoke the programs and/or modules and/or units stored in the storage medium 12 to perform functions. The storage medium 11 can include an external storage medium, and also can include an internal memory. The storage medium 11 can be a random-access storage medium, or a non-volatile storage medium, such as a hard disk, a memory, a plug-in hard disk, a smart media card (SMC), a secure digital (SD), a flash card, a disk storage component, a flash component, or other volatile solid memory.

Division of the modules is according to logical function, and other division manners may be adopted during practical implementation. Each function module in each embodiment of the present disclosure may be integrated into a processing module, each module may also exist independently and physically, and two or more than two modules may also be integrated into a module. The above-mentioned integrated module may be implemented in a form of hardware and may also be implemented in forms of hardware and software function module.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of monitoring operations of virtual machines, applicable in a virtual machine operation monitoring system with a central monitoring system, a cloud platform, virtual exchangers, and virtual machines; the method comprises:

the central monitoring system sends an obtaining instruction with a virtual network identifier and an IP address of the virtual machine to the cloud platform;

the cloud platform transmits the obtaining instruction to the virtual exchanger;

the virtual exchanger transmits the obtaining instruction to the virtual machine corresponding to the IP address in the obtaining instruction;

the virtual machine searches for operation information based on the obtaining instruction and sends the searched operation information to the virtual exchanger;

the virtual exchanger transmits the operation information to the cloud platform;

the cloud platform transmits the operation information to the central monitoring system; and the central monitoring system monitors and manages the operation information;

wherein the central monitoring system comprises a Zabbix server; the virtual machine comprises a Zabbix client; the method further comprises:

the Zabbix server sends the obtaining instruction to the cloud platform;

the cloud platform transmits the obtaining instruction to the virtual machine through the virtual exchanger; and the Zabbix client in the virtual machine searches for operation information based on the obtaining instruction;

wherein a network node of the cloud platform sets a proxy server; the method further comprises:

the proxy server receives the obtaining instruction from the Zabbix server;

the proxy server connects with the virtual exchanger through a network namespace;

the proxy server transmits the obtaining instruction to the virtual exchanger;

the proxy server receives the operation information transmitted by the virtual exchanger; and the proxy server transmits the operation information to the Zabbix server.

2. The method of claim 1, wherein the network namespace comprises a virtual network identifier, the IP address of the virtual machine, and a test project code; the proxy server selects the specified virtual exchanger based on the network namespace formed by the network identifier, the IP address and the test project code.

3. The method of claim 2, wherein the step of forming of the network namespace comprises:

the current network namespace is checked and a new network namespace is added;

a new virtual network identifier, an IP address of the virtual machine, and a test project code are added; and the newly added virtual network identifier, the IP address of the virtual machine, and the test project code are added into the newly added virtual network identifier.

4. The method of claim 3, wherein the virtual exchanger is formed by a OpenvSwitch tool; the virtual exchanger provides a network insulation protection; the central monitoring system comprises a Prometheus server and the virtual machine comprises an exporter; the method further comprises:

the Prometheus server sends a collection instruction to the cloud platform;

the cloud platform transmits the collection instruction to the virtual machine through the virtual exchanger;

the exporter in the virtual machine receives the collection instruction and collects the operation information in the virtual machine based on the collection instruction.

5. A virtual machine operation monitoring device comprises a processor and a storage medium; the storage medium stores computer programs; the computer programs are executed by the processor, which causes the processor to:
send an obtaining instruction with a virtual network identifier and an IP address of the virtual machine to a cloud platform by a central monitoring system;
transmit the obtaining instruction to a virtual exchanger by the cloud platform;
transmit the obtaining instruction to the virtual machine corresponding to the IP address in the obtaining instruction by the virtual exchanger;
search for operation information based on the obtaining instruction and send the searched operation information to the virtual exchanger by the virtual machine;
transmit the operation information to the cloud platform by the virtual exchanger;
transmit the operation information to the central monitoring system by the cloud platform; and
monitor and manage the operation information by the central monitoring system;
wherein the central monitoring system comprises a Zabbix server; the processor further:
sends the obtaining instruction to the cloud platform by the Zabbix server;
transmits the obtaining instruction to the virtual machine through the virtual exchanger by the cloud platform; and
searches for operation information based on the obtaining instruction by the Zabbix client in the virtual machine;
wherein a network node of the cloud platform sets a proxy server; the processor further:
receives the obtaining instruction from the Zabbix server by the proxy server;
connects the proxy server and the virtual exchanger through a network namespace;
transmits the obtaining instruction to the virtual exchanger by the proxy server;
receives the operation information transmitted by the virtual exchanger by the proxy server; and
transmits the operation information to the Zabbix server by the proxy server.

6. The virtual machine operation monitoring device of claim 5, wherein the network namespace comprises a virtual network identifier, the IP address of the virtual machine, and a test project code; the proxy server selects the specified virtual exchanger based on the network namespace formed by the network identifier, the IP address and the test project code.

7. The virtual machine operation monitoring device of claim 6, wherein the processor further:
check the current network namespace and add a new network namespace;
add a new virtual network identifier, an IP address of the virtual machine, and a test project code; and
add the newly added virtual network identifier, the IP address of the virtual machine, and the test project code into the newly added virtual network identifier.

8. The virtual machine operation monitoring device of claim 7, wherein the virtual exchanger is formed by a OpenvSwitch tool; the virtual exchanger provides a network insulation protection; the central monitoring system comprises a Prometheus server and the virtual machine comprises an exporter;
send a collection instruction to the cloud platform by the Prometheus serve;
transmit the collection instruction to the virtual machine through the virtual exchanger by the cloud platform;
receive the collection instruction and collect the operation information in the virtual machine based on the collection instruction by the exporter in the virtual machine.

* * * * *